United States Patent
Smith et al.

(10) Patent No.: US 7,085,931 B1
(45) Date of Patent: Aug. 1, 2006

(54) VIRTUAL SMART CARD SYSTEM AND METHOD

(75) Inventors: Lawrence Smith, Concord, CA (US); Richard Levenberg, Lafayette, CA (US)

(73) Assignee: Secure Computing Corporation, St. Paul, MN (US)

( * ) Notice: Subject to any disclaimer, the term of this patent is extended or adjusted under 35 U.S.C. 154(b) by 0 days.

(21) Appl. No.: 09/389,540

(22) Filed: Sep. 3, 1999

(51) Int. Cl.
*H04L 9/32* (2006.01)
*H04L 9/00* (2006.01)

(52) U.S. Cl. ............... 713/182; 713/175; 726/9
(58) Field of Classification Search .......... 380/25; 713/168–173, 175, 176, 182–186, 200–202
See application file for complete search history.

(56) References Cited

U.S. PATENT DOCUMENTS

| | | | | |
|---|---|---|---|---|
| 5,347,580 A | * | 9/1994 | Molva et al. | 713/159 |
| 5,418,854 A | | 5/1995 | Kaufman et al. | 380/23 |
| 5,495,533 A | | 2/1996 | Linehan et al. | 380/21 |
| 5,497,421 A | * | 3/1996 | Kaufman et al. | 713/156 |
| 5,944,824 A | * | 8/1999 | He | 713/201 |
| 5,982,898 A | * | 11/1999 | Hsu et al. | 713/156 |
| 6,000,832 A | * | 12/1999 | Franklin et al. | 700/232 |
| 6,067,621 A | * | 5/2000 | Yu et al. | 713/172 |
| 6,233,341 B1 | * | 5/2001 | Riggins | 380/277 |
| 6,470,453 B1 | * | 10/2002 | Vilhuber | 713/201 |
| 6,516,357 B1 | * | 2/2003 | Hamann et al. | 710/2 |
| 6,636,975 B1 | * | 10/2003 | Khidekel et al. | 713/202 |
| 6,775,382 B1 | * | 8/2004 | Al-Salqan | 380/286 |
| 2001/0014869 A1 | * | 8/2001 | Yoshizawa | 705/14 |
| 2005/0071636 A1 | * | 3/2005 | Lee et al. | 713/170 |

FOREIGN PATENT DOCUMENTS

| | | |
|---|---|---|
| EP | 0807911 A2 | 11/1997 |
| EP | 0862105 | 2/1998 |
| EP | 0936530 | 2/1998 |

OTHER PUBLICATIONS

Menezes, Alfred, et al, Handbook of Applied Cryptography, CRC Press, Wahington, D.C., 1996.*
Hystrom, "The SecurID SASL Mechanism", Apr. 2000, RFC 2808, p. 1-9.*
"A Discussion on the Issues Related to Smart Card Introduction", http://www.securitydynamics.com/products/whitepapers/smtcard.html, Security Dynamics Technologies, Inc., 1-4, (Mar. 1999).
"The Future of Secure Computing Corporation Authentication", *Secure Computing Corporation*, 1-5, (Mar. 1998).

(Continued)

*Primary Examiner*—Christopher Revak
(74) *Attorney, Agent, or Firm*—Schwegman, Lundberg, Woessner & Kluth, P.A

(57) ABSTRACT

A public key authentication system and method for use in a computer system having a plurality of users. The system includes a virtual smart card server, storage connected to the virtual smart card server, and a virtual smart card agent connected to the virtual smart card server. The storage includes a plurality of virtual smart cards, wherein each virtual smart card is associated with a user and wherein each smart card includes a private key. The virtual smart card agent authenticates the user and accesses the authenticated user's virtual smart card to obtain the user's private key.

14 Claims, 4 Drawing Sheets

OTHER PUBLICATIONS

Ellison, C.M., et al., "SPKI Certificate Theory", http://www.ietf.org/internet-drafts/draft-ietf-spki-cert-theroy-04.txt, 1-43, (Mar. 1999).

Ellison, C.M., et al., "SPKI Examples", http://www.ietf.org/internet/drafts/draft-ietf-spki-cert-examples-01.txt, 1-5, (Mar. 1999).

* cited by examiner

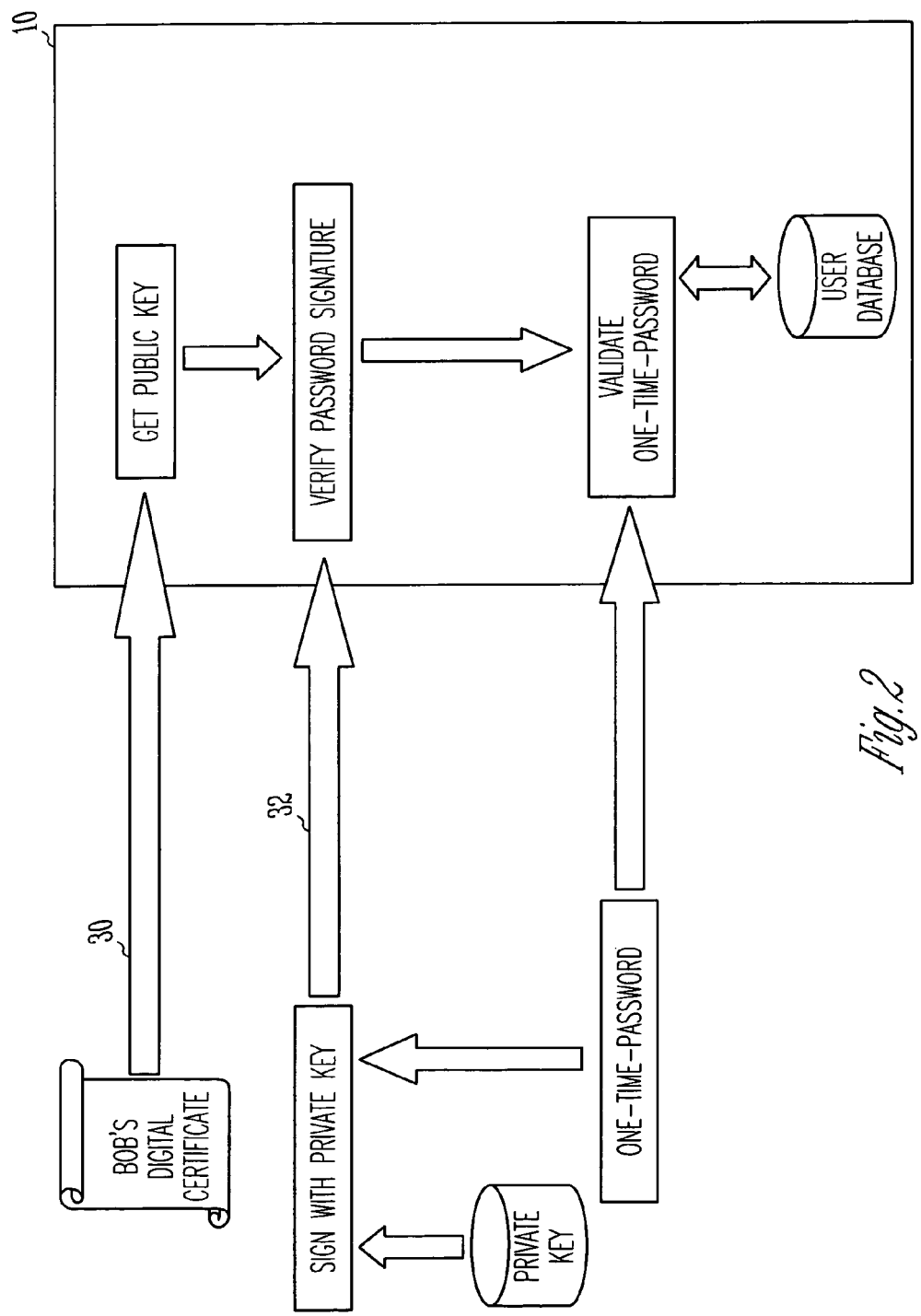

VIRTUAL SMART CARD SYSTEM AND METHOD

FIELD OF THE INVENTION

The present invention is related to computer security, and more particularly to system and method for user authentication.

BACKGROUND INFORMATION

As the world moves to a proliferation of internets, intranets and extranets, user authentication has become increasingly important. The most common authentication mechanism is a password. Static, user-selected passwords are inherently limited as protection devices, however, because of the relatively small number of bits of information they contain. In addition, users tend to select easy-to-guess passwords, thereby compromising the authentication process.

One-time passwords overcome many of these limitations. In a one-time password system the password changes every time it is used. Instead of a static phrase, the system assigns a static mathematical function. The result is a "dynamic password."

In one dynamic password system, the system provides an argument for the function and the user computes and returns the function value. This approach is termed "challenge/response." In challenge/response, a password generating device such as a token card receives a value from the system and computes a one-time password by plugging the value into a complex mathematical function. The one-time password is then transmitted to the system in order to authenticate the user. Challenge/response devices can be implemented in either hardware or software and are very effective for user authentication.

Smart cards have also been proposed for user authentication. For instance, smart cards can be used to carry a user's identity securely and conveniently. In a typical smart card authentication system users approach a terminal and insert their smart cards into a smart card reader. The system queries the smart card through the smart card reader and performs a user authentication based, for instance, on a one-time password.

Public key cryptography promises an even more effective means of authenticating a user. In public key cryptography, cryptographic keys come in public key/private key pairs. The public key is used to encrypt while the private key is used to decrypt.

The public key/private key pair is assigned to a user. The public key is used by others to encrypt data. The encrypted data can only be read by the owner of the corresponding private key.

Authentication of a user through public key cryptography is straightforward. Under the Public Key Infrastructure (PKI), each user possesses a unique distinguished name. For example, a user, Alice, generates a unique distinguished name and a public/private key pair. The distinguished name is associated with Alice's public key via an X509 Certificate signed by the trusted Certificate Authority (CA). In such a system, Alice keeps her private key secret and publishes her certificate with the CA.

Alice's public key is used to encrypt data so that only Alice, with her private key, can decrypt it. In a PKI-based system, a user wishing to communicate securely with Alice retrieves her certificate from the CA, obtains the associated public key and encrypts the communications with Alice's public key.

In addition, Alice's private key can be used to produce a digital signature The digital signature verifies that Alice signed the data and maintains the integrity of the data being transferred. To verify the signature, the user retrieves Alice's certificate from the CA and processes the signature with the associated public key.

The CA, therefore, is an integral part of the Public Key Infrastructure.

To-date there has been no cohesive approach to public key authentication. Digital certificates can be used to standardize how identities, rights and privileges are assigned to users but, although server-side digital certificates are becoming common, there are few applications which supply certificate-based credentials to individual users. Directory services may provide standard, enterprise-wide storage for information about users and systems, but to-date, directory services are not widely deployed. Smart cards may become a ubiquitous medium for safeguarding and transporting a user's credentials, but to-date, deployment costs and changing standards have slowed the deployment of smart cards for user authentication.

What is needed is a system and method for user authentication which uses a smart card to supply certificate-based credentials to individual users. In addition, what is needed is a certificate-based authentication system which operates in conjunction with methods of user authentication such as token-based authentication, biometrics and simple passwords.

SUMMARY OF THE INVENTION

According to one aspect of the present invention, a public key authentication system and method is described for use in a computer system having a plurality of users. The system includes a virtual smart card server, storage connected to the virtual smart card server, and a virtual smart card agent connected to the virtual smart card server. The storage includes a plurality of virtual smart cards, wherein each virtual smart card is associated with a user and wherein each smart card includes a private key. The virtual smart card agent authenticates the user and accesses the authenticated user's virtual smart card to obtain the user's private key.

According to another aspect of the present invention, a system and method of authenticating users, including a first user, attempting to access a computer system is described. First and second keys are assigned to each user, wherein the first and second key form a public/private key pair. A digital certificate is issued to the first user, wherein the digital certificate is associated with the second key assigned to the first user. The user enters a one-time password and it is encrypted with the first key assigned to the first user to form an encrypted one-time password. The digital certificate issued to the first user is checked to verify that it was signed by a recognized certificate authority. The second key is then accessed via the digital certificate and the encrypted one-time password is decrypted with the second key to recover the one-time password. The one-time password is then compared against an expected one-time password.

According to yet another aspect of the present invention, a public key authentication system and method is described for use in a computer system having a plurality of users. The system includes an authentication server, a directory service connected to the authentication server and a host system. The directory service includes a plurality of public keys, wherein each public key is associated with a unique user identifier. The host system includes a public key authentication client and an interface to a smart-card-enabled application, wherein the public key authentication client is connected to the authentication server. The public key authentication client receives a challenge issued by the authentication server, signs the challenge with a digital signature representing a user and sends the digital signature of the challenge back to the authentication server. The authentication server receives the digital signature of the challenge and verifies the digital signature with a public key retrieved from the directory service.

BRIEF DESCRIPTION OF THE DRAWINGS

In the following drawings, where the same number reflects similar function in each of the drawings.

FIG. 2 illustrates a method of authenticating a user according to the present invention.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

In an ideal world, a user's private key is generated on a secure device, such as a smart card, and is never exposed outside of that device. Even the owner has no physical access to his or her private key; only the public key leaves the device. Unfortunately, the world is not yet ideal.

Until smart cards become ubiquitous, private keys are vulnerable. Today, private keys are stored directly on the user's hard disk, protected by a simple password. The password is vulnerable to any number of well known password guessing attacks. Strong, two-factor authentication is needed to thwart these attacks. PKI-based public key authentication provides one potential solution to this problem.

As smart cards are deployed, a PKI-based public key authentication that is both portable and secure becomes possible. The user's private key is stored on the card. It is secured by a PIN, is never exposed outside the card, and the card is portable. A user proves his identity by presenting something he has (i.e., the card with its private key) and something he knows (i.e., the card's PIN).

Migration to public key authentication will, however, be evolutionary, not revolutionary. It won't happen overnight. There are two major obstacles to client-side PKI deployment: (1) smart card readers have not been deployed; and (2) disk-resident private keys are vulnerable to attack. In addition, the technological models don't always fit the current business and social models. As these issues and others resolve themselves, networks will continue to grow and so will the need for PKI-based authentications systems. In the meantime, what is needed is a public key authentication system which is secure and portable, but which can operate without smart cards. Such systems are shown in FIGS. 1a and 1b.

Figure 1A:
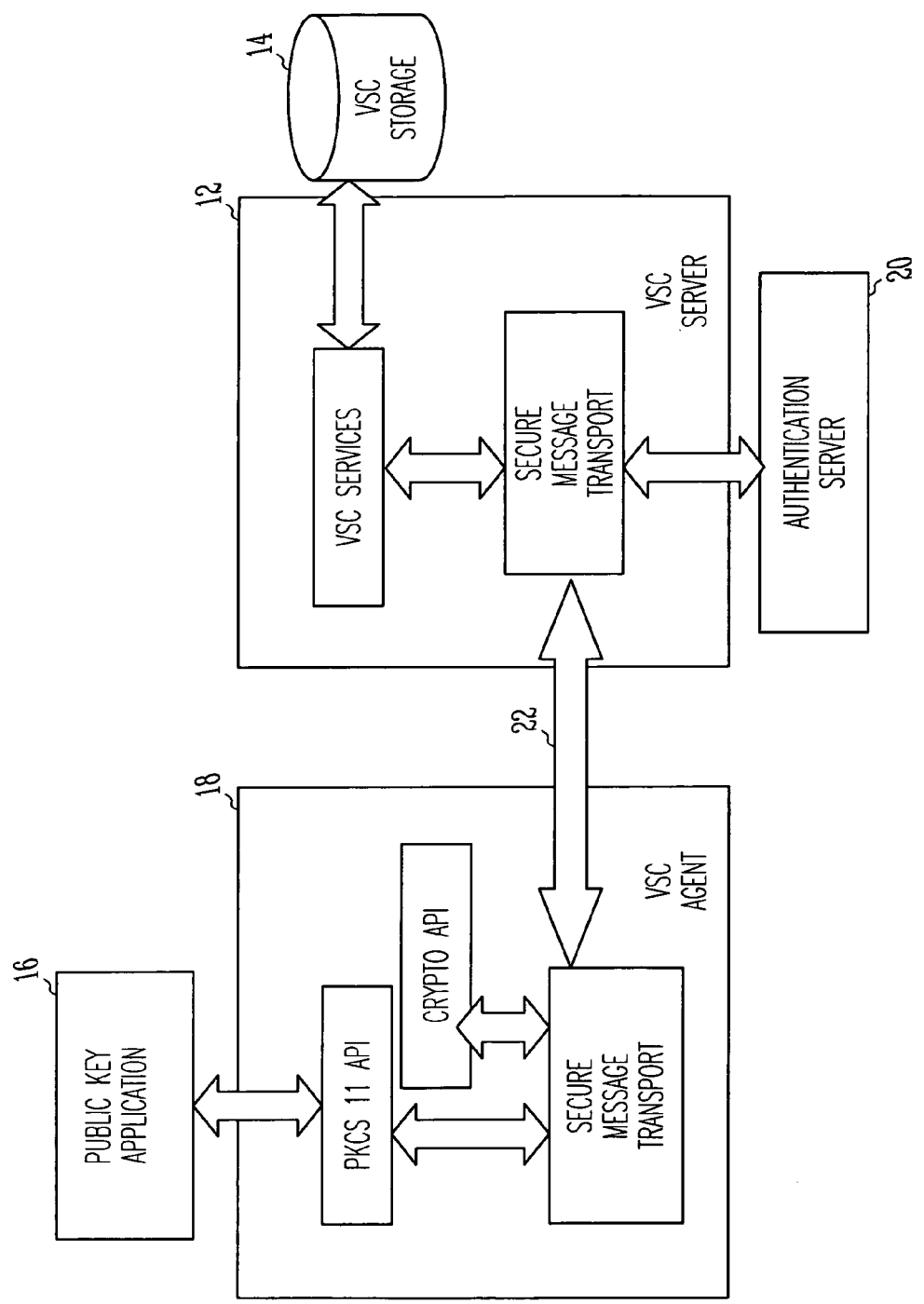
FIGS. 1a and 1b illustrate public key authentication systems according to the present invention.
Figure 1B:
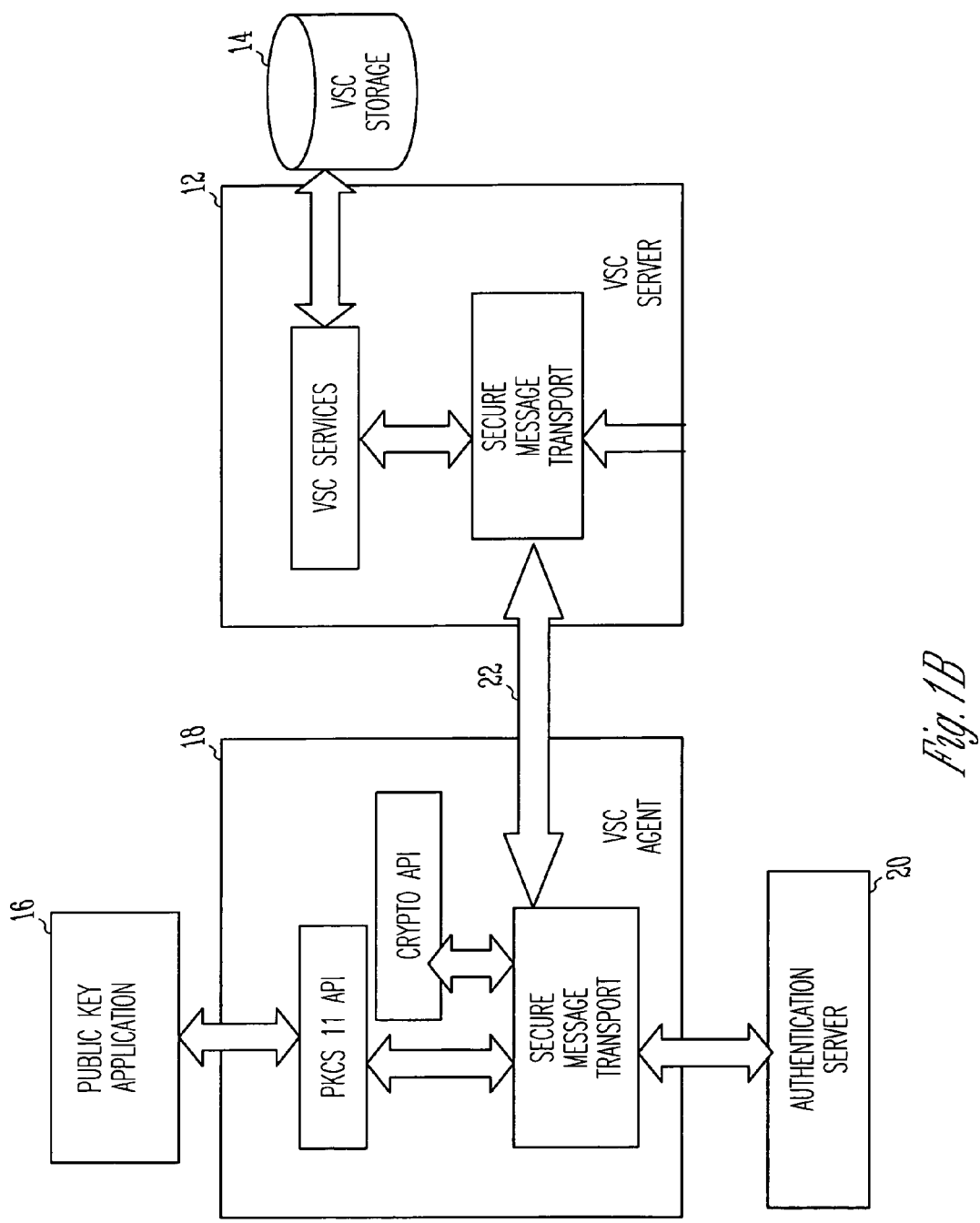

Public key authentication systems 10 for use in a computer system having a plurality of users are shown in FIGS. 1a and 1b. Public key authentication systems 10 of FIGS. 1a and 1b offer network accessible smart card services through emulated interfaces to smart-card-enabled applications without requiring a local smart card reader. Private keys are securely stored on a virtual smart card server, not on the user's local disk. In one embodiment, access to the server is limited to users who provide a correct one-time password.

Public key authentication systems 10 of FIGS. 1a and 1b include virtual smart card (VSC) server 12, VSC storage 14, public key application 16, VSC agent 18 and authentication server 20. VSC storage 14 includes a plurality of virtual smart cards, wherein each virtual smart card is associated with a user and wherein each smart card includes a private key. In one embodiment, communication between server 12 and agent 18 occurs over an agent-server message transport layer as will be described below.

Virtual smart card agent 18 authenticates the user and accesses the authenticated user's virtual smart card to obtain the user's private key. In one embodiment, VSC agent 18 emulates PKCS 11 and CryptoAPI interfaces to smart-card-enabled applications. In one such embodiment, PKCS 11 and CryptoAPI function calls are mapped into agent-server messages and forwarded to VSC server 12. The actual processing corresponding to each function call is remotely executed on server 12. This allows applications to access signing and encryption functions without exposing the user's private key outside of server 12.

Before VSC agent 18 can successfully access a user's private key or other virtual smart card data, the user must be authenticated. In one embodiment, authentication is accomplished through any of the one-time password mechanisms described above. For instance, in one embodiment, authentication is accomplished within agent 18 by means of a one-time password. One way of generating a one-time password is through the use of a standard authentication token (such as the SafeWord® token available from Secure Computing Corporation, San Jose, Calif.).

In one embodiment, system 10 provides secure storage of private keys, network accessible signing and key generation functions (without exposing the actual keys), and access to private keys through one-time-password authentication.

In one such embodiment, VSC server 12 maintains in VCS storage 14 a local database of virtual smart cards and associations between users and these virtual smart cards. Multiple smart cards may be associated with a single user. The private keys owned by a user are stored in the server's database and are never exposed outside of the server. The server supplies encryption, signing, and key management functions which are called remotely from VSC agent 18's PKCS 11 and CryptoAPI emulations. As noted above, however, access to server 12 is granted only if the user is first authenticated through a one-time password authentication procedure (such as authentication through a standard token).

In one embodiment, communication between server 12 and agent 18 occurs over an agent-server message transport layer 22. In one such embodiment, VSC agent 18 maps PKCS 11 and CryptoAPI function calls, function parameters, and return values into messages that are exchanged between agent 18 and VSC server 12. In one embodiment, these messages are transported over a secure TCP/IP session.

In one embodiment, server 12 performs the requested function on behalf of agent 18 and returns the result to agent 18. In one such embodiment, messaging between server 12 and agent 18 continues until a particular operation has concluded successfully. In one such embodiment, this operation is performed through an SSL connection to a secured web site.

In one embodiment, authentication server 20 validates the end user's one-time-password before he or she is granted access to any virtual smart card services. In one such embodiment, such as is shown in FIG. 1a, agent 18 accesses authentication server 20 over transport 22. In another embodiment, such as is shown in FIG. 1b, agent 18 accesses authentication server 20 directly or over a network connection.

Public key authentication system 10 provides two-factor authentication and allows the user to transport his or her private key and other smart card data from system to system without the added cost and complexity of deploying smart cards and smart card readers. This enables immediate deployment of smart card aware applications while minimizing the risk of premature commitment to a particular smart card vendor. Where one-time password tokens such as SafeWord® tokens are already deployed, it provides a clear migration path from tokens to public key authentication.

Public key authentication system 10, therefore, builds upon the success of one-time password-based authentication systems, while providing a clear evolutionary path to a PKI-based authentication system. One-time password-based systems are deployed and working right now. In addition to authentication services, systems such as the SafeWord® system provide a central point of administration, authorization and access-control features, and audit logs. Such systems, therefore, are ideal platforms from which to integrate PKI-based authentication into existing networks.

A public key authentication system such as system 10 positively identifies the owner of a private key and the associated public-key certificate and implements strong, two-factor authentication to protect system 10 from fraudulent access by an agent who steals a user's private key. An example of the use of system 10 to authenticate a user is shown in FIG. 2. In FIG. 2, the user is Bob. In one embodiment of system 10, Bob has, on his local disk, both a private key protected by a simple password, and a digital certificate issued by a certificate authority known to system 10. The digital certificate contains Bob's public key, and possibly other identifying information (e.g., his user ID for the system he is logging in to, or his access rights and privileges for that system).

As is shown in FIG. 2, Bob presents his credentials in two parts. First, at 30, Bob presents his digital certificate signed by a certificate authority known to system 10. Next Bob presents, at 32, a one-time-password (generated, for example, by a standard SafeWord® token). When the password is sent, it is digitally signed with the private key stored on Bob's hard disk.

System 10 first validates Bob's digital certificate by verifying that it was signed by a recognized certificate authority. If the certificate was properly signed, Bob's public key is extracted and used to verify the signature of the one-time-password. If the signature is valid, Bob's one-time-password is validated against the system 10's database. Assuming these three steps are successful, Bob's is "authenticated" and granted access to the host system.

In one embodiment, Bob does not physically possess his certificate. For instance, it might be located in a directory service of which system 10 is aware. Bob's private key would, however, remain located on the hard disk.

In another embodiment, Bob's certificate can be revoked at any time by placing the appropriate entry in a CRL known to system 10.

Finally, although FIG. 2 illustrates event-synchronous authentication of the one-time-password, system 10 can be designed to also support challenge-response authentication.

The previous section has shown how to protect vulnerable, disk-resident private keys with one-time-password technology. When private keys and digital certificates are stored on the user's local disk, simple password protection is not adequate. System 10's strong, two-factor authentication enables deployment of off-the-shelf, certificate-based PKI solutions today, while avoiding the cost and risk of deploying smart cards and smart card readers.

As smart cards are deployed, however, true two-factor authentication becomes possible. The user's secret key is stored on the card. It is secured by a PIN, is never exposed outside the card, and is portable. A user proves his identity by presenting something he has—the card with its private key—and something he knows—the card's PIN. In the emerging public-key world, however, multiple forms of authentication will coexist. Certificate-based authentication will become increasingly important, but token-based authentication, biometrics, and simple passwords will often be deployed alongside PKI systems.

Figure 3:
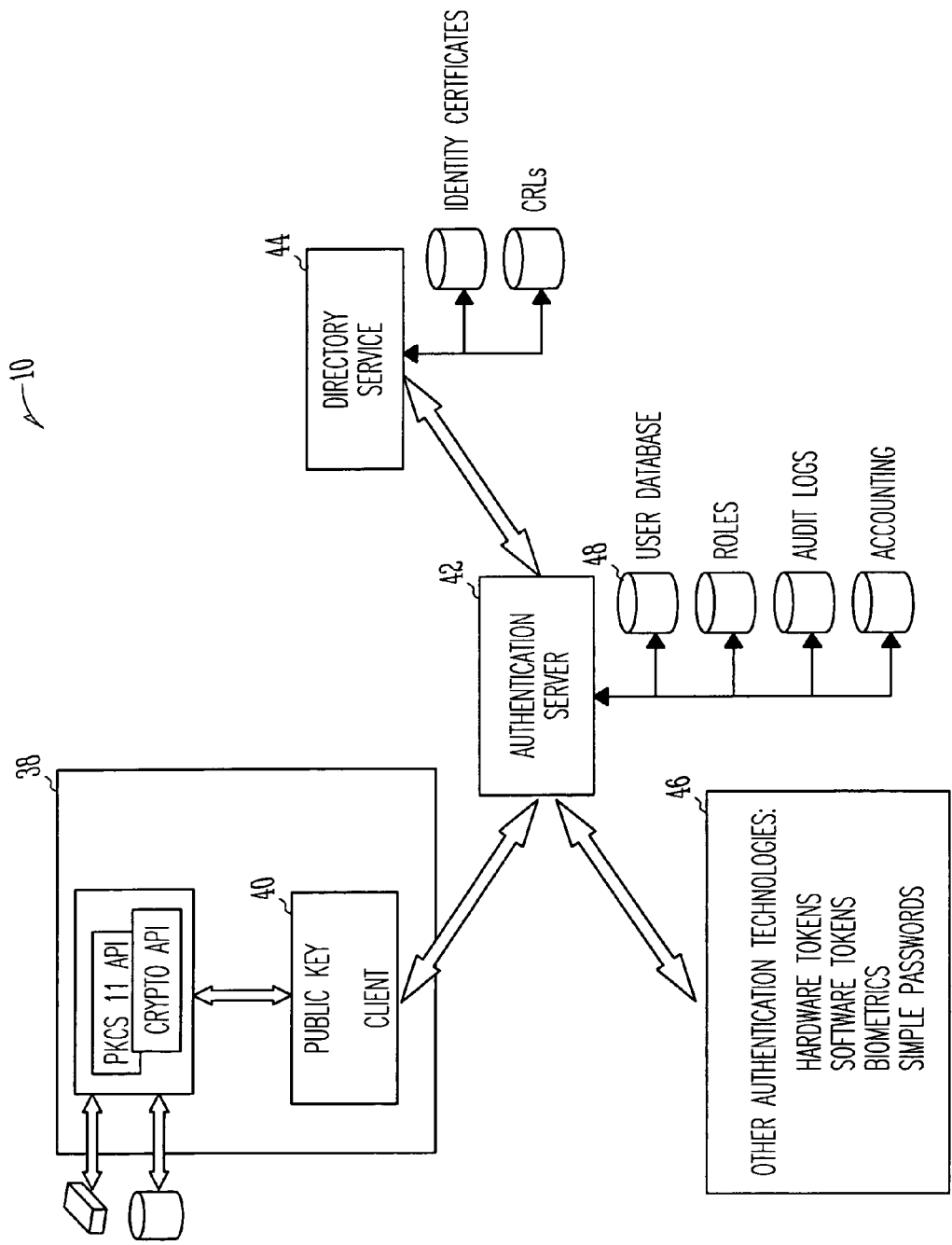
FIG. 3 illustrates another embodiment of a public key authentication system.

One embodiment of a system capable of handling each of these forms of authentication is shown in FIG. 3. In the embodiment of public key authentication system 10 shown in FIG. 3, system 10 directly supports public key authentication with smart cards while, at the same time, supporting other authentication devices—tokens, biometrics, simple passwords.

In the one embodiment, the principal components of this architecture are the public key client 40, the authentication server 42, and an LDAP compliant directory service 44. In the embodiment shown in FIG. 3, public key client 40 resides within host system 38.

In one such embodiment, public key client 40 is installed into the login process of host computer 38. It is analogous to the symmetric key clients shipped with one-time password-based systems such as the SafeWord® system. During login, client 40 connects to authentication server 42. Client 40 digitally signs a challenge issued by server 42 with the user's private key via either a PKCS 11 or CryptoAPI interface, and returns the response to server 42.

If server 42 successfully authenticates the user, additional access-control and authorization information may be returned from server 42 to client 40. Client 40 then applies this information during the remainder of the login process.

In one embodiment, server 42 generates, during an authentication session, a pseudo-random challenge toward client 40, retrieves the user's public key from LDAP compatible directory 44, and waits for a response. The response is expected to be a digital signature of the challenge. Upon receipt of the response, server 42 verifies the digital signature with the user's public key.

Because directory services are not yet widely deployed, public keys may also be stored directly into a user database 48 accessible by server 42.

In one embodiment, server 42 is CRL-aware, and can, therefore, verify that the user's identity certificate has not been revoked.

In addition to authentication functions, in one embodiment server 42 also provides access-control, auditing, and accounting functions for public-key authentication events. These functions may be fully integrated with those provided for other authentication methods—tokens, biometrics, simple passwords.

System 10 supports a number of well-know LDAP directory services. Identity certificates containing the public key(s) for a particular user may be stored there. These certificates may be generated by a third party PKI system, or by a certificate issuance system (not shown) integral to system 10.

In addition, directory service 44 may contain one or more CRLs of which system 10 is aware. These CRLs may, for example, originate from third-party PKI systems.

Within a given enterprise, multiple authentication technologies will likely be deployed. Newly installed systems may be public-key based. Legacy systems may continue to use token-based authentication. In addition, biometrics may be deployed in certain areas. Finally, systems with minimal security requirements may continue to use a simple password.

In one embodiment, system 10 allows a user to present different types of authentication credentials depending on his or her point of access. For example, a smart card may be required to access a secure server containing sensitive financial data, yet only a fixed password may be required to access the company phone book from a WEB browser.

In addition, system 10 enables the system administrator to manage diverse authentication technologies from a common management platform. It provides the following management functions for all supported authentication methods: User Administration, Role-based Access Control and Audit Logs.

PKI specifications do not directly address authorization and access control. Authorization and access control are, however, necessary components in any public key authentication scheme.

In one embodiment, system 10 provides a single point of user administration. In one such embodiment, user accounts are created, modified, and deleted from the management console. In addition, individual user's are granted access to multiple systems deleted from the same management console. In the event that a user leaves to company or is terminated, his or her access rights to all systems in the enterprise can be immediately revoked.

CRL issuance is slow, does not provide for immediate revocation of a user's access privileges, and does not address non-public-key authentication technologies. System 10, through its authentication servers (20 and 42) provides a single point from which to revoke a user's access privileges across an entire enterprise, for all points of authentication.

In one embodiment, role-based access control is supported across all types of authentication. A role defines a set of access rights and privileges. Each user is assigned to one or more roles. For example, members of the role "Managers" might be granted access to personnel files, while members of the role "Clerks" cannot access personnel files, but may access an order-entry system. By modifying the attributes of a role, the administrator may quickly change rights and privileges of a collection of users.

Auditing of authentication events is a vital part of managing secure networks. PKI specifications do not, however, directly address enterprise-wide audit and accounting needs. System 10 is uniquely positioned to integrate auditing information from all authentication technologies within an enterprise. In one embodiment, every authentication attempt and result within system 10 is logged for subsequent accounting and auditing purposes. In one embodiment, system 10 integrates the audit information from all forms of authentication across the entire enterprise into comprehensive, easily reviewed audit logs.

A public key authentication system such as system 10 builds upon the success of token-based one-time password systems, while providing a migration path to the PKI-based authentication systems of the future. As system such as system 10 provides not only authentication services, but also it provides a central point of administration, authorization and access-control features, and audit logs.

A system such as system 10 addresses the deficiencies of non-smart-card based PKI systems while maintaining the benefits of public key authentication. As noted in the Background, disk-resident private keys are vulnerable. System 10 protects those keys using one-time password technology. In addition, although smart cards will eventually house a user's private key, deployment of such cards will be slow due start-up costs and technological risks. System 10 facilitates the deployment of secure, virtual smart card services today, without the need to deploy smart cards and readers.

Furthermore, smart cards, once deployed, provide strong, two-factor, public-key authentication. System 10 directly supports smart-card based authentication.

Finally, public key technology will not be the only form of user authentication in a typical enterprise. Hardware and software tokens, biometrics, and simple passwords will continue to be deployed as well. System 10 integrates management of all of these technologies, providing a common platform for user administration, role-based access control, auditing across the enterprise.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. A public key authentication system for use in a computer system having a plurality of users, the system comprising:
    a virtual smart card server;
    storage connected to the virtual smart card server, wherein the storage includes a plurality of virtual smart cards, wherein each virtual smart card is associated with a user and wherein each smart card includes a private key; and
    a virtual smart card agent connected to the virtual smart card server, wherein the virtual smart card agent includes a user authentication interface for use by a user in entering a one-time password, wherein the virtual smart card agent authenticates the user using the one-time password and accesses the authenticated user's virtual smart card to obtain the user's private key.

2. The public key authentication system according to claim 1, wherein the virtual smart card agent includes an interface to a smart-card-enabled application.

3. The public key authentication system according to claim 2, wherein the virtual smart card server performs encryption in response to a remote call from the interface.

4. The public key authentication system according to claim 2, wherein the virtual smart card server performs signing in response to a remote call from the interface.

5. The public key authentication system according to claim 2, wherein the virtual smart card server performs key management functions in response to a remote call from the interface.

6. The public key authentication system according to claim 1, wherein the public key authentication system further includes an authentication server connected to the virtual smart card agent and wherein the virtual smart card agent authenticates the user through interaction with the authentication server.

7. The public key authentication system according to claim 1, wherein the public key authentication system further includes an authentication server connected to the virtual smart card server, wherein the authentication server includes means for authenticating a user using a one-time password authentication token.

8. The public key authentication system according to claim 1, wherein the virtual smart card agent communicates with the virtual smart card server over an agent-server transport layer.

9. The public key authentication system according to claim 1, wherein the virtual smart card agent communicates with the virtual smart card server over a secure TCP/IP session.

10. The method of claim 1, wherein entering a one-time password includes displaying the one-time password on an authentication token.

11. A method of authenticating users, including a first user, attempting to access a computer system, the method comprising:
  assigning first and second keys to each user, wherein the first and second key form a public/private key pair;
  issuing a digital certificate to the first user, wherein the digital certificate is associated with the second key assigned to the first user;
  entering a one-time password;
  encrypting the one-time password with the first key assigned to the first user to form an encrypted one-time password;
  verifying that the digital certificate issued to the first user was signed by a recognized certificate authority;
  accessing, via the digital certificate, the second key assigned to the first user;
  decrypting the encrypted one-time password with the second key associated with the digital certificate to recover the one-time password; and
  comparing the one-time password against an expected one-time password.

12. The method according to claim 11, wherein the first key is a private key and the second key is a public key.

13. The method according to claim 11, wherein verifying that the digital certificate issued to the first user was signed by a recognized certificate authority includes accessing a CRL to determine if the certificate has been revoked.

14. A computer-readable medium comprising program code which executes the method of claim 11.

* * * * *

UNITED STATES PATENT AND TRADEMARK OFFICE
CERTIFICATE OF CORRECTION

PATENT NO. : 7,085,931 B1
APPLICATION NO. : 09/389540
DATED : August 1, 2006
INVENTOR(S) : Smith et al.

It is certified that error appears in the above-identified patent and that said Letters Patent is hereby corrected as shown below:

On the Title page, in field (56), under "Foreign Patent Documents", in column 2, line 2, after "2/1998" insert -- G06F 1/00 --.

On the Title page, in field (56), under "Foreign Patent Documents", in column 2, line 3, after "2/1998" insert -- G06F 1/00 --.

On the Title page, in field (56), under "Other Publications", in column 2, line 1, delete "et al," and insert -- et al., --, therefor.

On the Title page, in field (56), under "Other Publications", in column 2, line 2, delete "Wahington," and insert -- Washington, --, therefor.

On the Title page, in field (56) under "Other Publications", in column 2, line 4, delete "p. 1-9." and insert -- pp.1-9. --, therefor.

On page 2, in field (56), under "Other Publications", in column 1, line 2, delete "theroy" and insert -- theory --, therefor.

On page 2, in field (56), under "Other Publications", in column 2, line 2, delete "1-5," and insert -- 1-15, --. therefor.

On the Title page, in field (74), in "Attorney, Agent, or Firm", in column 2, line 2, delete "P.A" and insert -- P. A. --, therefor.

In column 2, line 5, delete "The" and insert -- .The --, therefor.

In column 2, line 50, after "second" delete "key" and insert -- keys --, therefor.

In column 6, line 66, delete "well-know" and insert -- well-known --, therefor.

UNITED STATES PATENT AND TRADEMARK OFFICE
CERTIFICATE OF CORRECTION

PATENT NO.         : 7,085,931 B1
APPLICATION NO. : 09/389540
DATED              : August 1, 2006
INVENTOR(S)        : Smith et al.

It is certified that error appears in the above-identified patent and that said Letters Patent is hereby corrected as shown below:

In column 7, line 33, delete "user's" and insert -- users --, therefor.

Signed and Sealed this

Twenty-first Day of August, 2007

JON W. DUDAS
*Director of the United States Patent and Trademark Office*